US010755326B2

(12) United States Patent
Agrawal (10) Patent No.: US 10,755,326 B2
(45) Date of Patent: Aug. 25, 2020

(54) SYSTEM AND METHOD FOR MANAGING ON-DEMAND SERVICE DATA COLLECTIONS (71) Applicant: Lifeworx, Inc., New York, NY (US)

(72) Inventor: Bal Agrawal, New York, NY (US)

(73) Assignee: LIFEWORX, INC., Chappaqua, NY (US)

(*) Notice: Subject to any disclaimer, the term of this patent is extended or adjusted under 35 U.S.C. 154(b) by 537 days.

(21) Appl. No.: 14/985,079

(22) Filed: Dec. 30, 2015

(65) Prior Publication Data
US 2016/0189283 A1    Jun. 30, 2016

Related U.S. Application Data (60) Provisional application No. 62/098,233, filed on Dec. 30, 2014.

(51) Int. Cl.
*G06Q 30/06* (2012.01)
*G06Q 10/10* (2012.01)
*G06Q 50/10* (2012.01)

(52) U.S. Cl.
CPC ..... *G06Q 30/0609* (2013.01); *G06Q 10/1097* (2013.01); *G06Q 30/0635* (2013.01); *G06Q 50/10* (2013.01)

(58) Field of Classification Search
CPC ........... G06Q 30/0635; G06Q 10/1097; G06Q 50/30; G06Q 30/0631; G06Q 30/0609; G06Q 50/10; H04L 29/08972; H04L 67/2833
See application file for complete search history.

(56) References Cited

U.S. PATENT DOCUMENTS

| 7,401,025 | B1* | 7/2008 | Lokitz | G06Q 30/0281 705/346 |
| 7,587,377 | B2* | 9/2009 | Ren | G06F 16/90335 706/45 |
| 7,664,667 | B1* | 2/2010 | Ruppelt | G06Q 10/06311 705/7.13 |
| 7,716,077 | B1* | 5/2010 | Mikurak | G06Q 10/06 705/7.12 |
| 7,970,666 | B1* | 6/2011 | Handel | G06Q 10/06 705/28 |
| 2002/0147625 | A1* | 10/2002 | Kolke, Jr. | G06Q 10/06311 705/7.13 |
| 2003/0083895 | A1* | 5/2003 | Wright | G06Q 30/0601 705/26.1 |
| 2004/0019579 | A1* | 1/2004 | Herz | G07F 17/0014 |
| 2005/0175160 | A1* | 8/2005 | Simpson | G06Q 10/087 379/88.13 |
| 2005/0289131 | A1* | 12/2005 | Aenlle | H04L 67/02 |

(Continued)

*Primary Examiner* — Tyler W Knox
(74) *Attorney, Agent, or Firm* — Orrick, Herrington & Sutcliffe LLP (57) ABSTRACT

A system and method for managing on-demand services includes integrating a consumer's personal resources with institutional service providers. The consumer's service request is fulfilled by streamlining the selection of resources and seamlessly extending the search to a larger system when the consumer's personal resources are exhausted. The system and method advantageously provides focused communications to selected contacts and automates the selection process.

20 Claims, 7 Drawing Sheets

(56) References Cited

U.S. PATENT DOCUMENTS

| | | | |
|---|---|---|---|
| 2007/0226374 A1* | 9/2007 | Quarterman | G06Q 30/02 709/250 |
| 2008/0059270 A1* | 3/2008 | Baumer | G06Q 30/0205 705/7.21 |
| 2008/0065405 A1* | 3/2008 | Adelman | G06Q 50/01 705/319 |
| 2009/0271289 A1* | 10/2009 | Klinger | G06Q 30/02 705/26.1 |
| 2010/0049618 A1* | 2/2010 | Smith | G06Q 30/00 705/26.1 |
| 2011/0137776 A1* | 6/2011 | Goad | G06Q 30/0282 705/34 |
| 2012/0239417 A1* | 9/2012 | Pourfallah | G06Q 20/102 705/2 |
| 2012/0266258 A1* | 10/2012 | Tuchman | G06F 16/955 726/28 |
| 2012/0303425 A1* | 11/2012 | Katzin | G06Q 20/027 705/14.4 |
| 2013/0060591 A1* | 3/2013 | Meegan | G06Q 30/0214 705/7.19 |
| 2013/0204886 A1* | 8/2013 | Faith | G06Q 30/06 707/756 |
| 2013/0254289 A1* | 9/2013 | Cutri | H04L 51/32 709/204 |
| 2013/0346302 A1* | 12/2013 | Purves | G06Q 30/04 705/40 |
| 2014/0006125 A1* | 1/2014 | Meegan | G06Q 30/0214 705/14.16 |
| 2014/0046792 A1* | 2/2014 | Ganesan | G06Q 30/06 705/26.4 |
| 2014/0149248 A1* | 5/2014 | Bao | G06Q 50/01 705/26.7 |
| 2014/0229258 A1* | 8/2014 | Seriani | G06Q 10/08345 705/14.23 |
| 2014/0278859 A1* | 9/2014 | Gallucci | G06Q 30/0214 705/14.16 |
| 2014/0304505 A1* | 10/2014 | Dawson | H04L 63/0428 713/165 |
| 2014/0358803 A1* | 12/2014 | Carter | G06Q 10/10 705/311 |
| 2015/0081362 A1* | 3/2015 | Chadwick | G06Q 10/06311 705/7.14 |
| 2015/0142594 A1* | 5/2015 | Lutnick | G06Q 50/28 705/21 |
| 2016/0110836 A1* | 4/2016 | Garg | G06Q 20/405 705/13 |

* cited by examiner

Fig. 7

SYSTEM AND METHOD FOR MANAGING ON-DEMAND SERVICE DATA COLLECTIONS

CROSS-REFERENCE TO RELATED APPLICATIONS

This application claims priority to U.S. Provisional Patent Application Ser. No. 62/098,233, filed on Dec. 30, 2014, the disclosure of which is expressly incorporated herein by reference in its entirety and for all purposes.

FIELD

The present disclosure relates generally to an on-demand service marketplace and more specifically, but not exclusively, to systems and methods for requesting on-demand services through a mobile platform and identifying personnel to fulfill the requests.

BACKGROUND

Traditional communication networks (e.g., the Internet) facilitate the search for on-demand services, such as dining, transportation, babysitting, staffing, and so on. For example, a consumer can make a reservation for dinner, request a ride, search for a babysitter, or place an advertisement for help over a global network. Personnel seeking to fulfill a particular consumer request can respond based on the consumer's particular request.

However, conventional on-demand service systems rely on proprietary and/or institutional database systems. For example, a fleet management service (e.g., limousine fleets, Taxi companies, Uber®, and so on) dispatches drivers that are selected from a proprietary database. Stated in another way, conventional on-demand service systems attempt to fulfill consumer requests by selecting providers from a large infrastructure that may not offer a relevant solution for the particular consumer request. These conventional systems fail to account for resources that are readily available, and often more appropriate, to the consumer.

Most consumers have a network of trusted service providers that they would rely on before looking to a larger infrastructure for help. For example, a consumer looking for a ride to the airport can ask a network of friends or a local discounted driver company before calling a Taxi. Unfortunately, conventional on-demand service systems are disjointed from personal resources and often provide results that do not reflect the consumer's personal preferences.

In view of the foregoing, a need exists for an improved system and method for managing on-demand services in an effort to overcome the aforementioned obstacles and deficiencies of conventional on-demand service systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

As previously discussed, currently-available on-demand service systems are deficient because they fail to consider a consumer's personal network and resources. Consumers can ask members of their trusted network for help, such as, for example, by making individual calls, sending a group text message, and/or broadcasting a message over social media. However, this manual process can be time-consuming, any responses must be sorted through, and anyone receiving the request likely is unaware of whether the problem has been solved. Furthermore, if the problem cannot be solved through the consumer's trusted network alone, a larger network of service providers is not seamlessly introduced to provide a solution. Accordingly, a service management system that connects the consumer's resources with a large network of service providers to autonomously fulfill consumer service requests can prove desirable and provide a basis for a wide range of on-demand service applications. This result can be achieved, according to one embodiment disclosed herein, by a mobile platform management system 100 as illustrated in FIG. 1.

Figure 1:
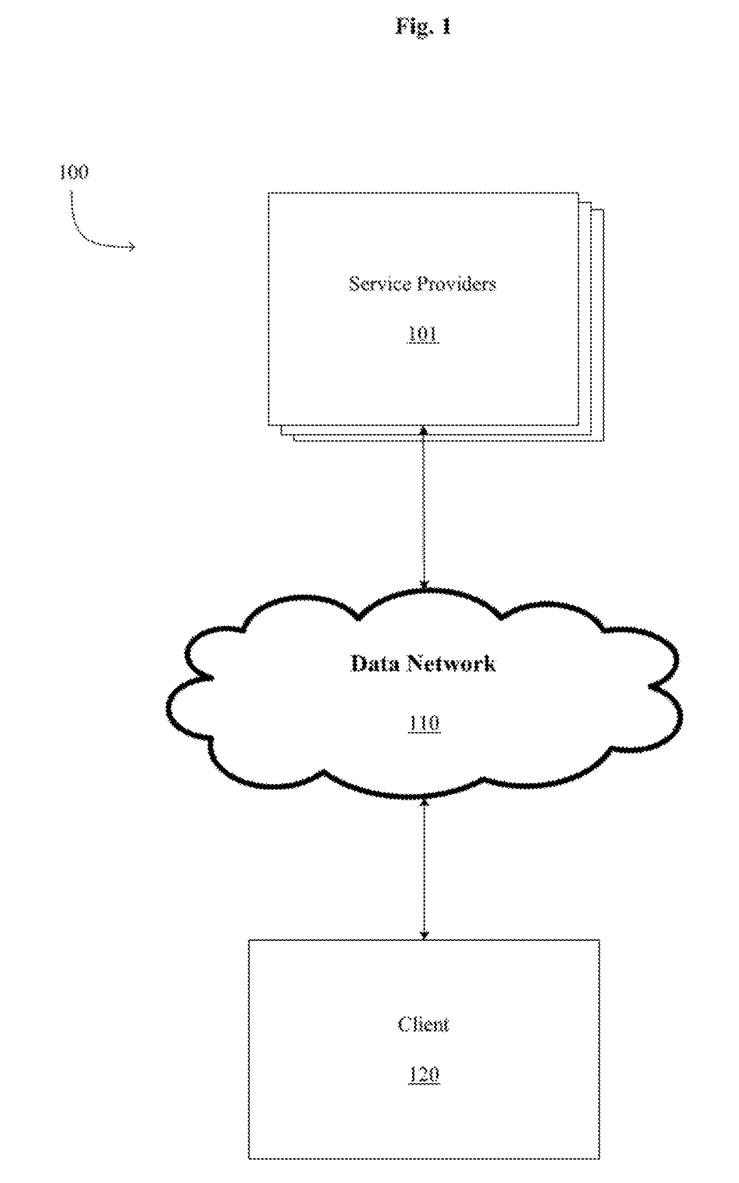
FIG. 1 is an exemplary top-level block diagram illustrating an embodiment of an on-demand service management system.

Turning to FIG. 1, a predetermined number of service providers 101 are available to fulfill a consumer request, for example, received from a client 120 over a data network 110. The client 120 includes any number of computers, terminals, network enabled devices (e.g., mobile devices, cell phones, smart phones, and so on), personal digital assistants, laptop computers, tablet devices, televisions, and other machines and devices that utilize processors, memory, and instructions stored on a computer-readable mediums. Additionally, the client 120 enables a consumer (or user) to communicate over the data network 110.

The data network 110 includes any number of wired data networks and/or any conventional wireless communication network, for example, radio, Wireless Fidelity (Wi-Fi), cellular, satellite, and broadcasting networks. Exemplary suitable wireless communication technologies used with data network 110 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio MetropolitanArea Network (HiperMAN), Local Multipoint Distribution Service (LMDS), Worldwide Interoperability for Microwave Access (WiMAX), ZIGBEE, BLUETOOTH, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), TimeDivision Synchronous Code Division Multiple Access (TD-SCDMA), Evolution-Data Optimized (EV-DO), Digital Enhanced Cordless Telecommunications (DECT) and others.

The client 120 also can receive information from and optionally communicate directly with one or more of the service providers 101. In some embodiments, the service providers 101 represent any number of on-demand services and/or consumer resources as desired. Exemplary service providers 101 include without limitation, friends, family members, food services, delivery services, transport services, telegram services, entertainment services, and so on. In an exemplary scenario, the service providers 101 represent a proprietary database of employees within a business. For instance, an on-demand transport service (e.g., Taxis, Uber®, and/or limousine business) can maintain a proprietary database of drivers included in the service providers 101. The service providers 101 can be unique to a particular location to accommodate the client 120. Accordingly, a consumer on the client 120 can request a ride to the airport by submitting a consumer request over the data network 110. A selected service provider 101 can respond to the consumer request and notify the consumer on the client 120.

However, most consumers will have a network of trusted service providers that may not be represented by the service providers 101. Particularly in the exemplary scenario above, a consumer's friend or relative that can take the consumer to the airport may not be included in the service providers 101. Accordingly, FIG. 2 illustrates an alternative embodiment of the mobile platform management system 100 for connecting a consumer's resources and network of trusted service providers.

Figure 2:
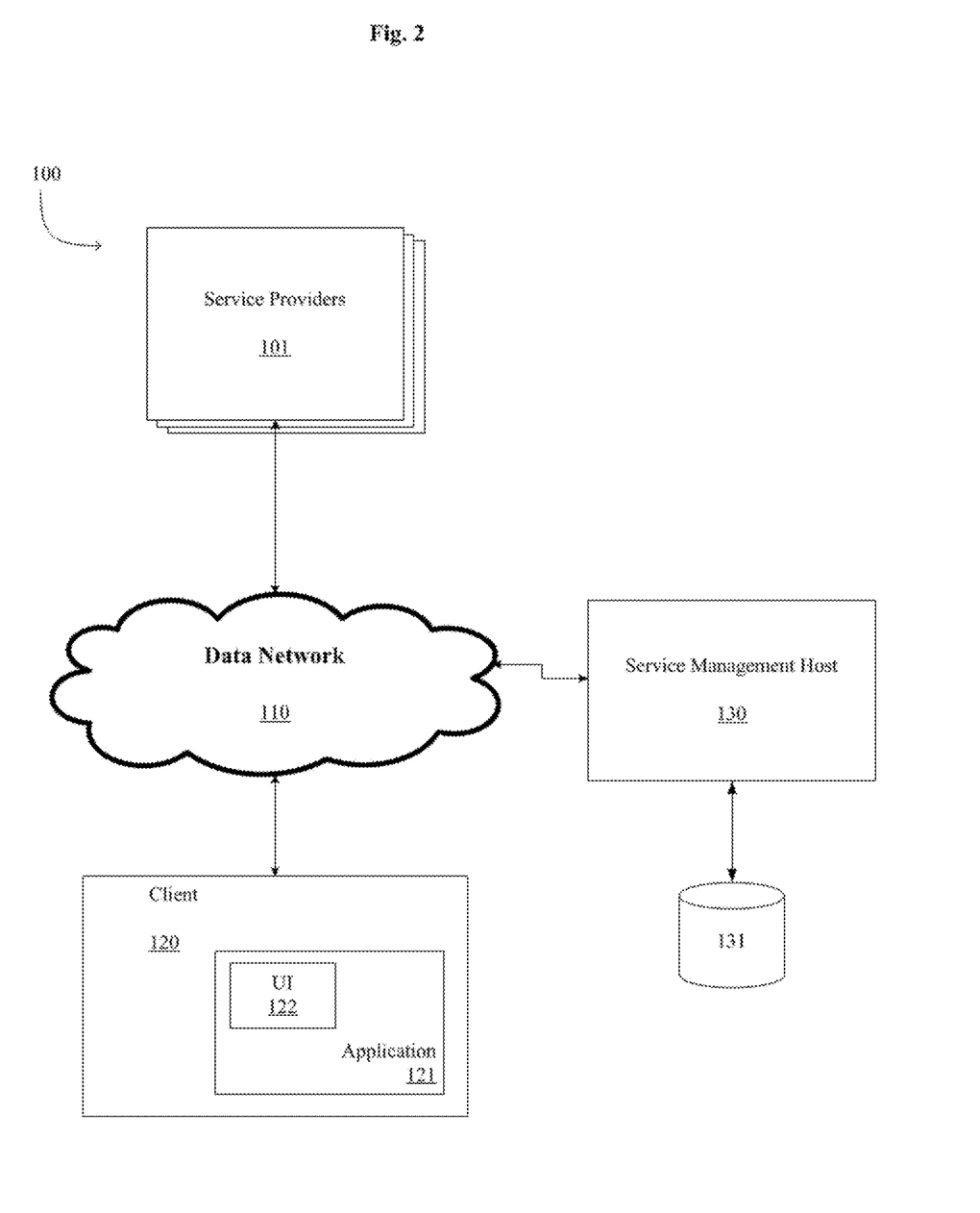
FIG. 2 is an exemplary top-level block diagram illustrating another embodiment of the on-demand service management system of FIG. 1.

With reference now to FIG. 2, a service management host 130 can communicate with both the client 120 and the service providers 101 over the data network 110. In some embodiments, the service management host 130 acts as an application server for performing the functions described herein. Accordingly, the client 120 enables the consumer (or the user) to communicate with the service providers 101 through the application server (e.g., the service management host 130), for example, using any communication protocol (e.g., Transmission Control Protocol and Internet Protocol (TCP/IP)) and/or secured communication protocol (e.g., Secure Sockets Layer (SSL) Hypertext Transfer Protocol (HTTP)).

The service management host 130 includes a database 131, which comprises any number of computer storage mediums, such as hard drives, portable storage units, disk drives, flash memory, magnetic memory, and so on. The database 131 can be used with any logical datamodel including network, relational (e.g., MYSQL and/or MYSQL clusters), entity, object-oriented, document, entity-attribute, semantic, and so on. In some embodiments, although shown as comprising separate functional components, the service management host 130 and service providers 101 can reside on the same computing device for communicating with the client 120. For example, the service providers 101 can represent the current inventory of on-demand services and/or consumer resources that are stored in the database 131.

In some embodiments, the client 120 includes a service application 121, such as a computer program that is downloaded onto a smartphone or portable computer device. The components of system 100 can combine to provide a user interface 122 within the service application 121. The user interface 122 can be configured with various content provided by the service application 121, the service management host 130, and/or consumer input to the client device 120. This content can be dynamically adjusted based on user selections via the user interface 122. In some embodiments, the consumer can download and install the service application 121 on a selected client 120 and register the selected client 120, for example, with the service management host 130. Additionally and/or alternatively, the user interface 122 can be implemented as features on a web page (e.g., hosted at the service management host 130) accessible over the data network 110 for display on the client 120. Changes and customizations are then stored by the service management host 130 on the database 131.

In one embodiment, consumers can register with the service management host 130 and complete a verification process through the user interface 122. A new consumer fills outs a registration form with information used for authentication by the service management host 130. Exemplary registration forms can include selection/input of a user name, login name, password, contact information (e.g., phone, e-mail address, biography), photograph, notification settings, calendars, and so on. This information can be manually submitted through the user interface 122 and/or imported from third-party sites, such as social media sites and/or from other web servers. The service management host 130 registers the new consumer and creates a new user profile of the registered consumer for storage in the database 131. For example, the data that comprises the user profile information is used to create a user account by creating related records in the database 131.

Similarly, service providers 101 and other service providers looking for work can register with the service management host 130. For potential employees (e.g., the service providers 101 and the other service providers looking for work), registration can include adding a set of skills and sub-skills, which can be used by the consumer to filter when selecting a service provider. Advantageously, service providers 101 can fulfill consumer requests via the service management host 130. Registration for service providers 101 can be similar to the registration process for consumers described above. As desired, a consumer profile stored in the database 131 can be flagged with a marker indicating whether the profile represents a consumer or a service provider.

As discussed above, most consumers have a network of trusted service providers that the consumers would prefer to request assistance from before looking to a larger network of service providers 101. Advantageously, the service management host 130 can integrate a large infrastructure of service providers with a consumer's personal network of trusted service providers. Once a consumer registers with the service management host 130, the consumer can add a list of contacts that represent their trusted network. These contacts can be in the form of references to other active or pending accounts represented in the database 131 at the direction of the service management host 130.

The list of contacts can include friends, relatives, neighbors, preferred service providers, and so on. In some embodiments, the service application 121 accesses a consumer's contacts stored on the client 120 and imports a selected number of contacts from the stored contacts. Additionally and/or alternatively, the consumer can import contacts from third-party sites, such as social media sites and/or from other web servers, as well as manually input information for a contact to be added. Each contact is associated with a user profile in the database 131 and can include the contact's phone number, e-mail, avatar, name, location data, and so on.

In most embodiments, consumers can create lists of contacts, wherein contacts are organized by a specific service area. For example, the consumer can create a list of favorite restaurants from the contacts, a list of preferred drivers for transportation, a list of trusted babysitters, and a list of preferred employees (e.g., substitute teachers, on-call technicians, etc.). Each list can include a unique set of contacts or overlap with other lists. This category data is stored with the users profile in the database 131. Stated in another way, the category data is specific to the profile of the user adding the contact and does not impact the profile of the contact in any other context.

Figure 3:
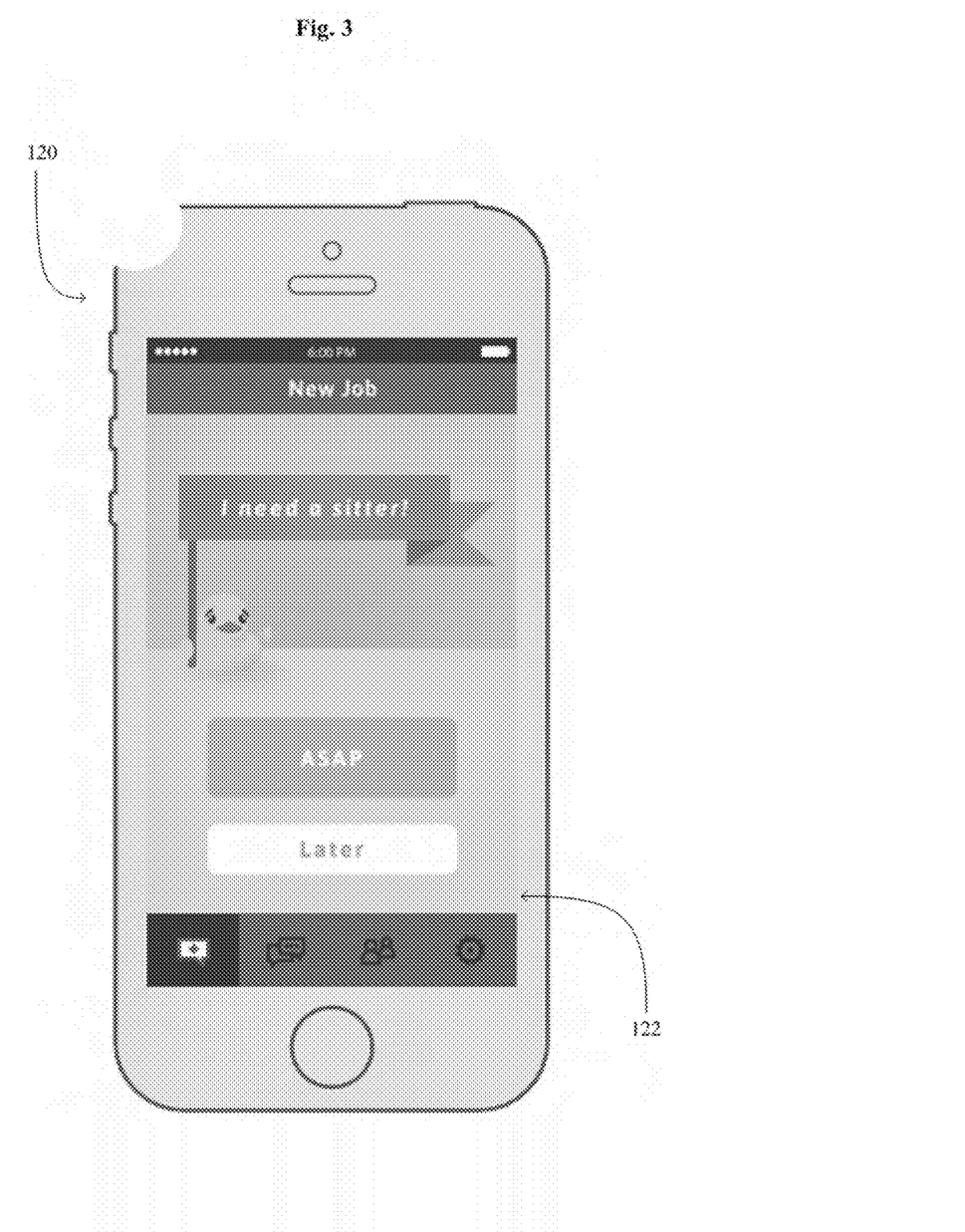
FIG. 3 is an exemplary screenshot illustrating an embodiment of the user interface of FIG. 2.

FIG. 3 provides one embodiment of the user interface 122 that can be displayed on the client 120. In this example, a request creation screen is shown for submitting a consumer request for a babysitter. Although not shown, the user interface 122 can provide any suitable home screen display for first selecting the particular service area for the consumer request. This location data can be manually entered, derived from the profile of the user, and/or collected from global positioning systems (not shown) on the device 120.

Figure 4:
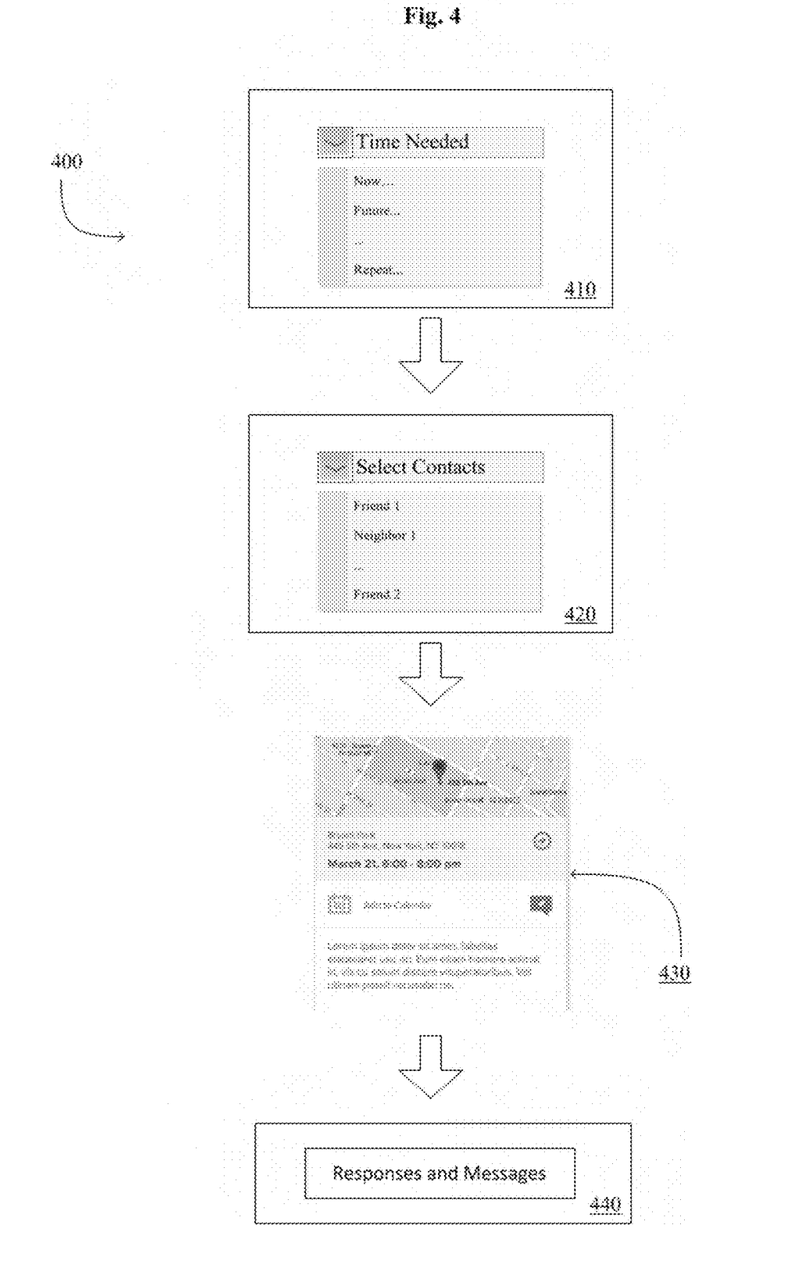
FIG. 4 is an exemplary functional block diagram illustrating an embodiment of a consumer service request that can be used with the system of FIG. 1.

The request creation screen can provide any number of consumer requests from the client 120 to the service management host 130 in any suitable manner described herein, including via an exemplary process 400 for creating a new consumer request, shown in FIG. 4. With reference to FIG. 4, the exemplary process 400 is shown as including a plurality of processes, which need not be performed in the order depicted. Each consumer request will initiate an event chain invoking communication to the selected parties relative to the parameters of each request.

In some embodiments, the consumer is first presented with a selection of time (or urgency) 410 that the service request is needed. For example, the consumer can request service as soon as possible ("ASAP"), for a future time/date, and/or a repeat service request (e.g., house cleaning). If the consumer selects service for a future time/date, the consumer subsequently enters (not shown) a start date/time and, optionally, an end data/time for the service request. Although not shown, the consumer can customize flags to indicate the time that the service request is needed. For example, each service request can be categorized as "emergency," "general help," "childcare," "close friends," "transportation," and so on. These flags can be unique and multiple flags can be used for a specific request. In addition, any consumer request of a given category can be considered to be an "ASAP" request, indicating that help of the type specified is required immediately.

In an alternative embodiment, each of the user's contacts (compared to service requests) can be flagged based on relevance and utility of the contact. Therefore, consumers can select a group or all contacts for a particular request based on the particular consumer need. For example, a selected user contact can be flagged with "best friend" and "for emergency." When the consumer submits a request (e.g., need a ride, sitters in Orlando, Fla., good ski instructors in Park City, dog care at home, and/or "best friends for emergency"), the consumer quickly can select the appropriate group of contacts for the particular request and advantageously channel communications for the particular purpose.

Once a requested time is entered or the consumer chose to request service as soon as possible, the consumer is presented with a selection of contacts 420. Alternatively, the selection of contacts 420 can be preloaded in any manner such as based on previously similar requests or contact flags discussed above. For preloaded contacts, the consumer can manually edit the preloaded list (e.g., deselect contacts or add new contacts).

The selection of contacts 420 can include the network of trusted service providers, the service providers 101, and/or the lists of any of the preceding associated with the consumer's user profile stored in the database 131. Additionally and/or alternatively, the selection of contacts 420 includes an option for manual entry of a specific contact that is not shown. The consumer can highlight one or more of the contacts/lists of contacts displayed on the selection of contacts 420.

When the desired contacts are selected, the consumer can add additional details to a job description 430. As an example, the consumer requesting a babysitter can add a location, the number of children to be watched, skills required, the children's preferences (e.g., allergies, medication, bed time, pay), and so on. A custom message describing additional details for the job (e.g., why the request is being made) can be included in the job description 430. In some embodiments, the job description 430 can be preloaded based on consumer input and/or past behavior. For example, if the consumer selected only four highly skilled babysitters in newborn care for the consumer request, the job description 430 can include a message that a person skilled in newborn care is appropriate.

In some embodiments, the consumer can select a "first responder" option (not shown), to facilitate selection of replies from the selected contacts. When the "first responder" option is selected, the service management host 130 can choose to give the job to the first contact that responds to the consumer's request. The consumer is notified of the acceptance, the other providers are notified that the job has been filled, and the job is then closed (e.g., flagged in the database 131 to indicate that the issue represented requires no further action). The "first responder" option beneficially relieves the consumer seeking assistance from constantly reviewing any responses. The consumer submits the detailed consumer request to the service management host 130.

Additionally and/or alternatively, the service management host 130 can facilitate the generation of service requests on behalf of the consumer, for example, based on the user profile of the registered consumer in the database 131. In some embodiments, the service management host 130 identifies gaps in coverage based on the calendar stored for a selected user profile. A consumer request can be generated automatically based on these gaps for the selected user.

The service management host 130 can broadcast the consumer request to each of the selected contacts associated with the consumer request, for example, based on the contact information stored in the database 131. The service management host 130 can communicate with each of the contacts over the data network 110 in any suitable means. For example, the consumer request can be pushed (via the installed service application 121 for registered service providers 101), e-mailed, and/or messaged (e.g., multimedia messaging service (MMS) and/or short message service (SMS)) to the selected contacts. In one embodiment, messaging occurs within the user interface 122 of the service application 121. In preferred embodiments, the consumer request is broadcast to the selected contacts without showing each of the selected contacts information regarding the other recipients of the request. Maintaining the privacy of each selected contact advantageously prevents any single contact from being flooded with a number of messages and/or placing contacts in unreasonably competitive situations with one another.

Once the service request has been broadcasted, the service management host 130 receives any responses 440 to the request from the selected contacts. The selected contacts can view the broadcasted service request via the installed service application 121 and/or other suitable means on the client 120. For example, for selected contacts with push notifications enabled, the selected contact will receive the pending request on their mobile device (e.g., the client 120) and can view the description of the job. If push notifications are disabled, the selected contact can open the service application 121 to view incoming service requests and/or view service requests via text message (e.g., SMS and/or MMS) and/or e-mail.

In most embodiments, an option to communicate directly with the requesting consumer is provided to the selected contact. Communication between the selected contact and requesting consumer can be used to provide additional details regarding the job and other questions that each party may have. The selected contact can choose to accept or decline the received consumer request. Declining the request sets flags in the database 131 with the control of the service management host 130 to indicate that that line of communication relative to the specific job is closed and requires no further attention.

Figure 5:
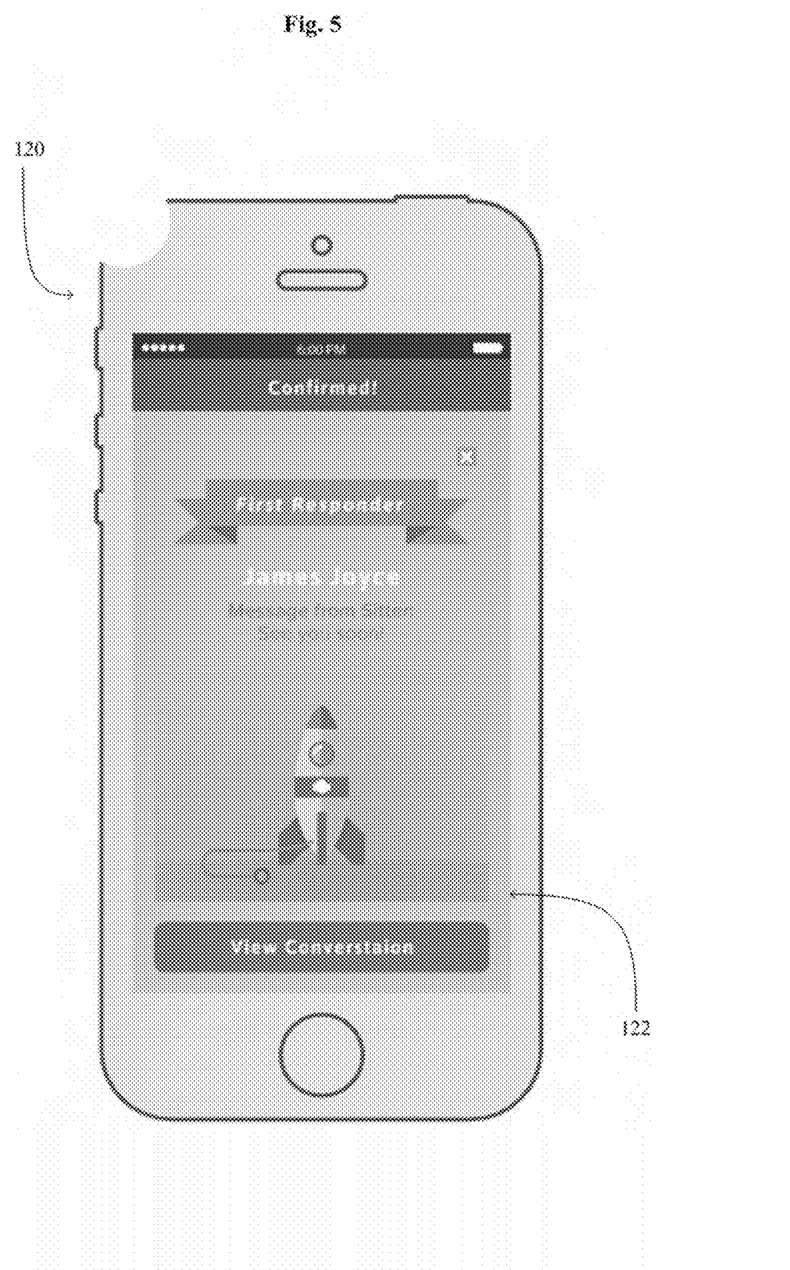
FIG. 5 is an exemplary screenshot illustrating another embodiment of the user interface of FIG. 2.

If the "first responder" option was selected, once the service management host 130 receives a first response, the service management host 130 confirms the service request has been handled and notifies both the consumer and all of the other selected contacts. Alternatively, if the "first responder" option was not selected, the consumer can review any received responses (optionally including a message history) and accept or decline assistance from the selected contacts that are available to assist. Similarly, the service management host 130 confirms the service request has been handled and notifies both the consumer and all of the other selected contacts. An exemplary user interface 122 showing a confirmation screen to the consumer is illustrated in FIG. 5. All the data pertaining to the job and its attendant communication threads are updated and flagged accordingly.

Additionally and/or alternatively, the service management host 130 can hide or delete service requests from a selected contact's client 120 once a service request has been handled.

In another embodiment, if the service request has not been handled and/or could not be handled by the consumer selected contacts alone, the consumer request can be extended to a larger infrastructure (e.g., the service providers 101). The consumer can also open the service request to contacts that were not previously selected or to additional service providers that may belong to a proprietary organization (e.g., third party transportation services). Accordingly, system 100 benefits the consumer by seamlessly integrating the consumer's personal resources with large, institutional service providers. The consumer can elect providers from their personal trusted network and exhaust preferred options before opening the search to other connections.

Similar to selecting the consumer's own contacts, opening the service request to a larger infrastructure can follow the "first selection" process or any other process described above. Accordingly, the process for fulfilling a consumer request can be streamlined to select personal resources and/or service providers from the larger infrastructure. The contacts provided by the service provider (e.g., service providers 101) are delivered to the service management host 130 via a private network connection to the service provider's internal (e.g., proprietary and/or institutional database) systems.

In some exemplary scenarios, the system 100 can fulfill consumer requests using the methods described above. For example, a mother is looking for a babysitter because her son is sick. It is 7:00 AM and the mother has a meeting at 8:30 AM and does not have much flexibility of time. The mother does not want to spend the money on professional services so she uses the system 100 to send a message to four personally-known babysitters and her sister, who are using the service application 121. She chooses the option for the first responder. Unfortunately, her five contacts do not respond for 15 minutes. The larger institution based search is automatically activated based on her settings, and a babysitters profile is sent to her with details that the babysitter will be there at 8:15 AM.

In another example, a school has a need for substitute 7th grade History teacher. The manager has a list of seven substitute middle school History teachers and uses the system 100 to send the request out for a first responder. Within two minutes, one of the selected substitute teachers accepts with a message that he will be there at 8:45 AM.

In yet another example, a couple has visitors from the city and is in a bind to go out for dinner on Saturday evening. The group has a reason to celebrate, so a local deli or pizza place will not do. Using the system 100, the couple can send a message to his favorite five local restaurants (e.g., if the name and contact information of the owner or manager of the restaurant are in the database 131) to request any accommodation (e.g., possibly due to a last minute cancellation or no show). One of the favorite restaurants accepts and the group of four enjoys a nice meal without spending 20 minutes calling and checking in with all local places on exploring new places on the Internet.

In some embodiments, components of system 100 can be combined to provide further functionality for the consumer including sharing of contacts. For example, the consumer can select a recipient from the client 120 and selects a list of trusted mechanics to the recipient. If the recipient has installed the service application 121, the list of shared contacts can be pending on the recipient's service application 121. If the recipient has not installed the service application 121, a temporary account is created, the pending contacts added to the temporary account, and an invitation is sent to the recipient to download the service application 121 and validate the account.

Additionally, consumers can also provide a rating system, such as a star rating, and reviews for contacts and service providers 101 with whom the consumer has used. The rating system can also include notes. These ratings, reviews, and/or notes will be associated with the profile of the particular service provider 101 and may be used for internal scoring, ranking, and optionally displayed as a part of the user's profile for the particular service provider 101.

In other embodiments, the database 131 maintains a history of consumer requests and contacts that were used with a user's profile. In some embodiments, the history of consumer requests and contacts may be flagged as closed or potentially archived, but are not deleted.

The service application 121 can also notify selected contacts of a revised urgency. For example, if a group of selected contacts receives a consumer request and only two selected contacts remain that have not yet declined, the consumer request can be upgraded and marked with an urgent flag. This will also create a flag relative to the request that a service provider from the proprietary collection of providers may be needed and steps may be taken to prepare an alternate solution to head off a potential issue.

Figure 6:
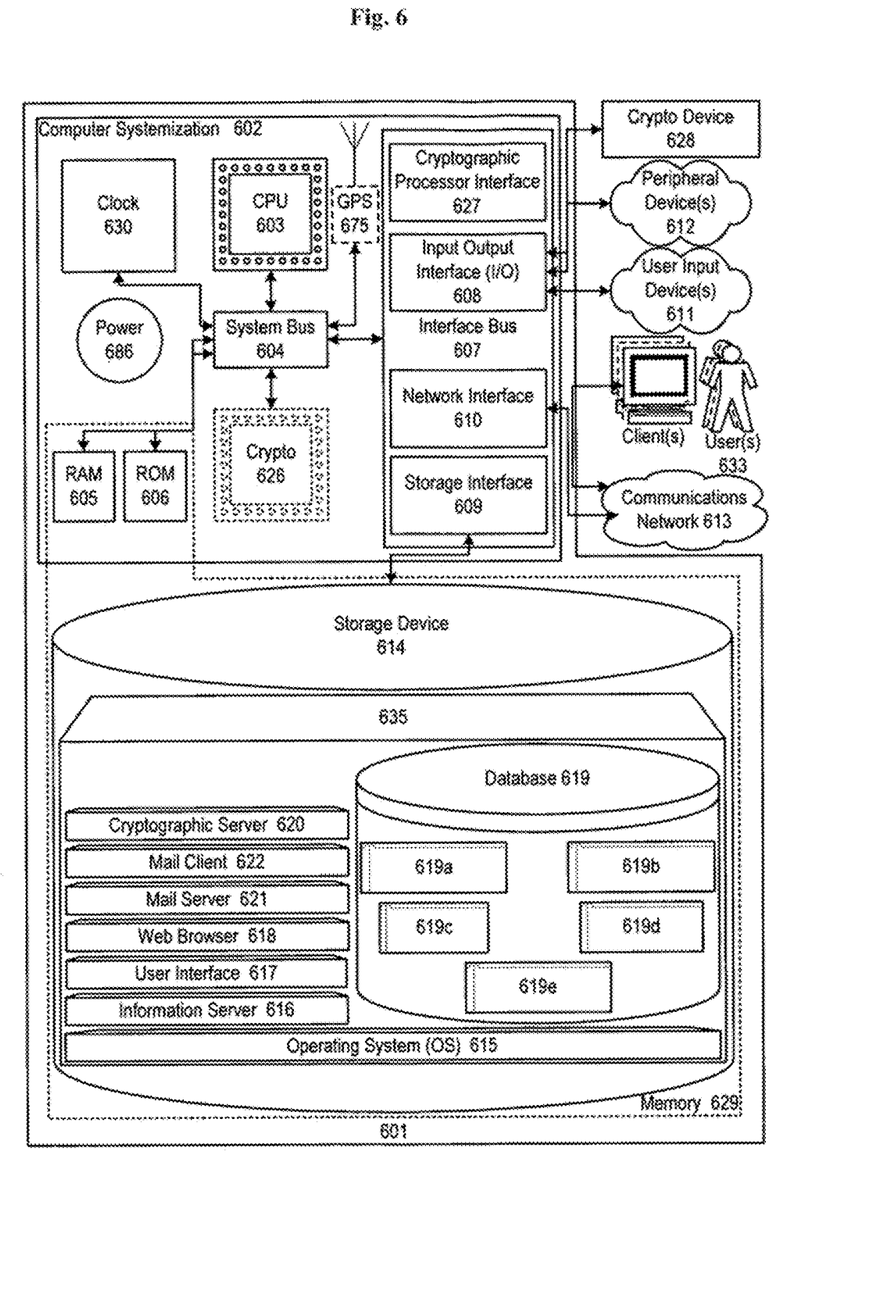
FIG. 6 is an exemplary systemization diagram for one embodiment of the disclosed system of FIG. 1.

FIG. 6 of the present disclosure illustrates other aspects of a service management host 601 in a block diagram. In this embodiment, the service management host 601 may serve to execute any of the processes discussed above. It should be noted that the client's device and the service provider may be comprised in a device similar to the service management host 601.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the service management host 601 may be connected to and/or communicate with entities such as, but not limited to: one or more users from user input devices 611; peripheral devices 612; a cryptographic processor device 628; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The service management host 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, FD, Duron and/or Opteron; IBM and/or Motorola's PowerPC; Intel's Core, Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the service management host controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the service management host thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the service management host 601 is accessible through remote clients 633*b* (e.g., computers with web browsers) by users 633. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; HDMI; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT), Plasma, Organic Light-Emitting Diode (OLED), and/or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the service management host 601 may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the service management host controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the service management host 601 controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); the service management host module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory, and/or the like.

Operating System

The operating system module 615 is executable program code facilitating the operation of the service management host controller. Typically, the operating system facilitates access of I/O, network interfaces, peripheral devices, storage devices, and/or the like. The operating system may be a highly fault tolerant, scalable, and secure system such as Apple Macintosh OS X (Server), "Cheetah," "Jaguar," "Panther," "Tiger," "Mavericks," "Lion" (server), AT&T Plan 9, Be OS, Linux, Unix, and/or the like operating systems. However, more limited and/or less secure operating systems also may be employed such as Apple Macintosh OS, Google Chromium OS, Microsoft DOS, Palm OS, Windows Vista/CE/2000/2003/3.1/95/98/CE/Millenium/NT/XP (Server), and/or the like. Basically, any current or future network connected operating system could also fulfill this role. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the service management host controller to communicate with other entities through a communications network 613. Various communication protocols may be used by the service management host 601 as a subcarrier transport mechanism for interaction, such as, but not limited to: multicast, TCP/IP, UDP, unicast, and/or the like.

In some embodiments, the operating system can be implemented as a distributed operating system, a multi-tasking operating system, a multi-user system, a real-time system, an embedded operating system, and/or a templated operating system.

Information Server

An information server module 616 is stored program code that is executed by the CPU. The information server may be a conventional Internet information server such as, but not limited to Apache Software Foundation's Apache, Microsoft's Internet Information Server, and/or the information server may allow for the execution of program modules through facilities such as Active Server Page (ASP), ActiveX, (ANSI) (Objective-) C (++), C #, Common Gateway Interface (CGI) scripts, Java, JavaScript, Ruby. Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the service management host controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the service management host database 619, operating systems, other program modules, user interfaces, Web browsers, and/or the like.

Access to the service management host database may be achieved through a number of database bridge mechanisms such as through scripting languages as enumerated below (e.g., CGI) and through inter-application communication channels as enumerated below (e.g., CORBA, WEBOBJECTS, etc.). Any data requests through a Web browser are parsed through the bridge mechanism into appropriate grammars as required by the service management host. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the service management host as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the APPLE MACINTOSH Operating System's AQUA, MICROSOFT's WINDOWS XP, or UNIX's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as APPLE MACINTOSH OS, e.g., Aqua, MICROSOFT WINDOWS (NT/XP), UNIX X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as GOOGLE CHROME, MOZILLA FIREFOX, SAFARI, MICROSOFT INTERNET EXPLORER, or NETSCAPE NAVIGATOR. Secure Web browsing may be supplied with 128 bit (or greater) encryption by way of HTTPS, SSL, and/or the like. Some Web browsers allow for the execution of program modules through facilities such as JAVA, JAVASCRIPT, ACTIVEX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the time based search enabled nodes. The combined application may be nugatory on systems employing standard Web browsers.

Cryptographic Server

A cryptographic server module 620 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the service management host may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for a digital audio file. A cryptographic module may communicate to and/or with other modules in a module collection, including itself, and/or facilities of the like. The cryptographic module supports encryption schemes allowing for the secure transmission of information across a communications network to enable the service management host module to engage in secure transactions if so desired. The cryptographic module facilitates the secure accessing of resources on the service management host and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Service Management Host Database

The service management host database module 619 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the service management host database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the service management host database is implemented as a data-structure, the use of the service management host database 619 may be integrated into another module such as the service management host interface 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

The Service Management Host Interface

The service management host interface 635 is stored program code that is executed by the CPU. The service management host affects accessing, obtaining and the provision of information, services, transactions, and/or the like across various communications networks.

The service management host interface 635 enables access of information between nodes may be developed by employing standard development tools such as, but not limited to: ANSI, Objective-C, C, C++, Apache modules, binary executables, database adapters, Java, JavaScript, mapping tools, procedural and object oriented development tools, PERL, Python, shell scripts, SQL commands, web application server extensions, WebObjects, and/or the like. In one embodiment, the service management host server employs a cryptographic server to encrypt and decrypt communications. The service management host module may communicate to and/or with other modules in a module collection, including itself, and/or facilities of the like. Most frequently, the service management host interface 635 communicates with the service management host database, operating systems, other program modules, and/or the like. The service management host may contain, communicate, generate, obtain, and/or provide program module, system, user, and/or data communications, requests, and/or responses.

Distributed Service Management Host

The structure and/or operation of any of the service management host controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the service management host controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

Figure 7:
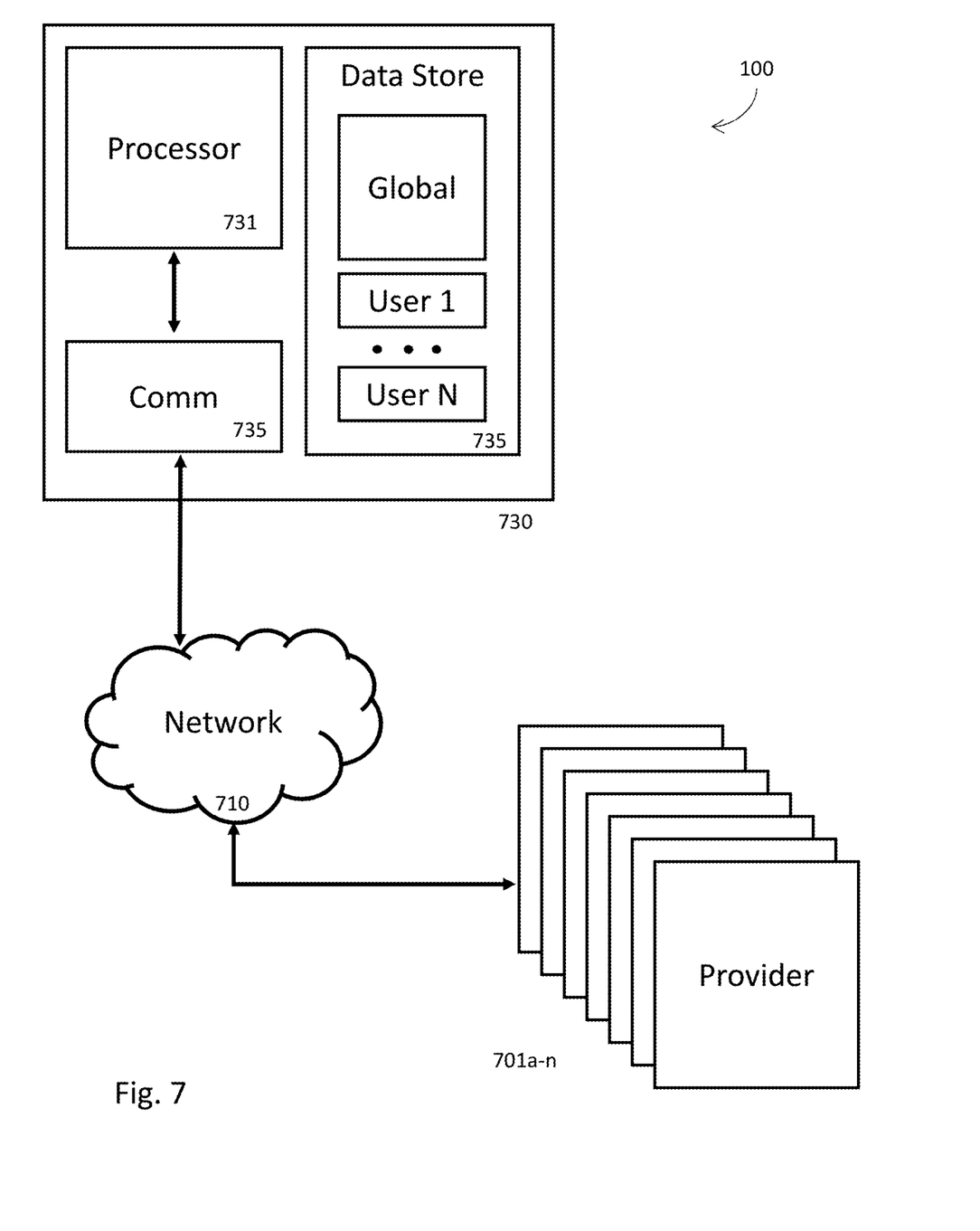
FIG. 7 is an exemplary top-level block diagram illustrating yet another embodiment of the on-demand service management system of FIG. 1.

In accordance with the disclosure of the above systemization, a further embodiment of the on-demand service management system 100 is shown in FIG. 7. A service provider management system 730 includes one or more processors 731, a communications interface 732, and a data storage system 735. As described above, the disclosed systems advantageously permit users of the on-demand service management system 100 to request service assistance from their own private network of service providers and, should that effort fail, seamlessly retransmit the service request out to the system's system wide network of service providers.

To facilitate the operation of the service provider management host system, the system's data storage holds information both about the service providers available to all the users and information about the user's personal network of service providers. However, users may be reluctant to use the system it the privacy of their contacts will be compromised. For example, failure to secure the users' information could result in the users' friends and family receiving unwanted spam or could result in a trusted personal childcare provider being "poached" by another family. Accordingly, in one advantageous embodiment of the disclosed system the provider data stored by system is divided into different collections with different permissions. In particular, a first data collection, having a first set of permissions, representing a collection system-wide service providers, wherein the first set permission enables the service providers to be queried for any user. And, user specific data collections, having a second set of permissions related to a specified user, representing a collection of user specific service providers, wherein the second set of permissions prohibits querying of service providers in the user specific data collection for any user other than the specified user.

During operation the processor connected to the communications interface and the data storage unit is programmed to carry out the system. In such operation, the system receives a service request over the communications interface from a requesting user. Next, it transmits the service request over the communications interface to the user specific service providers specified in a user specific data collection related to the requesting user. After the initial service requests are sent to the users' personal network the system monitors the received responses from the user specific service providers waiting to see if anyone agrees to provide the service. In order to determine when the effort to get service from the personal service providers fails, the system establishes a trigger event that will specify when the transmit the service request to the system-wide service providers specified in the first data collection. Advantageous trigger events include, a pre-set amount of time, return messages from the service providers declining the service, or a combination thereof. Or, the system might accept a specific request from the user to search the system-wide set of providers.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computerized system for service scheduling through a website over a data network, the website facilitating the management and display of electronic content, comprising:
   a service management host including a communications interface;
   a portable computing device in operable communication with the service management host over a data network and configured to provide a user interface of the website within a service application;
   a data storage system including:
      a first object-oriented data collection, having a first set of permissions, representing a collection of system-wide service providers, wherein the first set of permissions enables the service providers to be queried for any user; and
      one or more user specific data collections, having a second set of permissions related to a specified user, representing a collection of user specific service providers, wherein the second set of permissions prohibits querying of service providers in the user specific data collection for any user other than the specified user;
   a processor of the service management host operatively connected to the communications interface and the data storage unit; and
   a non-volatile memory of the service management host comprising instructions that when executed by the processor are operable to:
      receive a service request over the communications interface from a requesting user of the service application of the portable computing device;
      parsing the received service request through a bridge mechanism into one or more tagged text terms and associated field tags;
      generating a relational database query for the data storage system based on the tagged text terms using their associated field tags;
      querying the data storage system using the generated relational database query to identify the user specific service providers specified in the user specific data collection related to the requesting user;
      transmit the service request over the communications interface to the identified user specific service providers;
      monitor received responses from the user specific service providers by parsing the received responses through the bridge mechanisms into one or more tagged response terms, wherein if one or more of the user specific service providers does not accept the service request based on the one or more tagged response terms prior to a specified event, the processor will automatically transmit the service request to one or more of the system-wide service providers specified in the first object-oriented data collection on behalf of the requesting user; and
      display on the user interface of the portable computing device a summary of the received responses using the tagged text terms and the tagged response terms, wherein the summary is displayed following the specified event.

2. The computerized system of claim 1, wherein the specified event is a time limit.

3. The computerized system of claim 1, wherein the specified event is a recipient of messages from all the specific service providers declining to provide service.

4. The computerized system of claim 1, wherein the specified event is a signal from the requesting user telling the system to search the system-wide service providers.

5. The computerized system of claim 1, wherein the data storage system further includes a user database for maintaining a user profile of the requesting user.

6. The computerized system of claim 5, wherein the user database maintains at least one of a user name, a login name, a password, contact information, a photograph, a notification setting, and a calendar for the requesting user.

7. The computerized system of claim 6, wherein said non-volatile memory comprises instructions that when executed by the processor are further operable to automatically generate the service request from the requesting user based on the user database.

8. The computerized system of claim 1, wherein the first set of permissions is unique for the requesting user and identifies only a preferred sub-set of the one or more of the system-wide service providers.

9. The computerized system of claim 1, wherein said non-volatile memory comprises instructions that when executed by the processor are further operable to display to the requesting user the received responses.

10. The computerized system of claim 1, wherein said non-volatile memory comprises instructions that when executed by the processor are further operable to notify the user specific service providers and the one or more of the system-wide service providers results of the service request based on the received responses.

11. The computerized system of claim 1, wherein said non-volatile memory comprises instructions that when executed by the processor are further operable to receive a rating over the communications interface from the requesting user of at least one of the user specific service providers and the one or more of the system-wide service providers.

12. A computer-based method for service scheduling through a website over a data network, the website facilitating the management and display of electronic content, comprising:
receiving a service request over a communications interface of a service management host from a requesting user of a service application of a portable computing device;
parsing the received service request through a bridge mechanism into one or more tagged text terms and associated field tags;
generating a relational database query for a data storage system based on the tagged text terms using their associated field tags, the data storage system including a first object-oriented data collection, having a first set of permissions, representing a collection of system-wide service providers, wherein the first set of permissions enables the service providers to be queried for any user, and one or more user specific data collections, having a second set of permissions related to a specified user, representing a collection of user specific service providers, wherein the second set of permissions prohibits querying of service providers in the user specific data collection for any user other than the specified user;
querying the data storage system using the generated relational database query to identify the user specific service providers specified in the user specific data collection related to the requesting user;
transmitting the service request over the communications interface to the identified user specific service providers specified;
monitoring received responses from the user specific service providers by parsing the received responses through the bridge mechanisms into one or more tagged response terms, wherein if one or more of the user specific service providers does not accept the service request based on the one or more tagged response terms prior to a specified event, the service request is automatically transmitted to one or more system-wide service providers specified in the first object-oriented data collection; and
displaying on a user interface of the website being displayed within the service application of the portable computing device a summary of the received responses using the tagged text terms and the tagged response terms, wherein the summary is displayed following the specified event.

13. The method of claim 12, wherein the specified event is a time limit.

14. The method of claim 12, wherein the specified event is a recipient of messages from all the specific service providers declining to provide service.

15. The method of claim 12, wherein the specified event is a signal from the requesting user telling the system to search the system-wide service providers.

16. The method of claim 12, further comprising maintaining a user profile of the requesting user.

17. The method of claim 16, wherein the user profile identifies at least one of a user name, a login name, a password, contact information, a photograph, a notification setting, and a calendar for the requesting user.

18. The method of claim 16, further comprising automatically generating the service request from the requesting user based on the user profile.

19. The method of claim 12, further comprising displaying the received responses to the requesting user.

20. The method of claim 12, further comprising closing the service request if at least one of the user specific service providers and the system-wide service providers accepts the request.

* * * * *